United States Patent
Guerrero et al.

(10) Patent No.: US 7,516,126 B2
(45) Date of Patent: Apr. 7, 2009

(54) METHOD AND APPARATUS TO PERFORM A MULTI-FIELD MATCHING SEARCH

(75) Inventors: Miguel Guerrero, Fremont, CA (US);
Kinyip Sit, Sunnyvale, CA (US);
Sreenath Kurupati, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1009 days.

(21) Appl. No.: 10/611,770

(22) Filed: Jun. 30, 2003

(65) Prior Publication Data

US 2005/0053072 A1    Mar. 10, 2005

(51) Int. Cl.
*G06F 7/00*    (2006.01)
(52) U.S. Cl. .......................................... 707/4; 707/102
(58) Field of Classification Search ............ 370/395.32; 707/4, 102
See application file for complete search history.

(56) References Cited

U.S. PATENT DOCUMENTS 6,542,896 B1 *   4/2003   Gruenwald ................. 707/101
6,778,530 B1 *   8/2004   Greene ....................... 370/389
7,054,315 B2 *   5/2006   Liao ........................... 370/392
2002/0188587 A1 * 12/2002 McGreevy ..................... 707/1

OTHER PUBLICATIONS

V. Srinivasan et al., "Fast and Scalable Layer Four Switching", Proc. of Sigcom, 1998, www.acm.org.
P. Gupta et al., "Packet Classification on Multiple Fields", Proc. of Sigcom, 1998, www.acm.org.

* cited by examiner

*Primary Examiner*—Seema S Rao
*Assistant Examiner*—Sai-Ming Chan
(74) *Attorney, Agent, or Firm*—Blakely, Sokoloff, Taylor & Zafman LLP

(57) ABSTRACT

A method and apparatus to perform a multi-field matching search. A search unit groups single fields of a multiple-field source into a search target having multiple-field keys (MFKs) whose single fields correspond to the single fields in multiple-field vectors (MFVs) of entries in a data structure. The search unit generates a set of queries based, at least in part, on the MFKs, where each query has a different MFK as a lead MFK. The search unit determines, based, at least in part, on a query, whether the non-wildcard values in the MFVs of an entry match the non-wildcard values in corresponding MFKs of the search target. If no entry has non-wildcard values in the MFVs that match the corresponding non-wildcard values in the MFKs, the search unit searches for, based, at least in part, on the set of queries, the entry having non-wildcard values in a MFV that match the non-wildcard values in a corresponding lead MFK, plus remaining MFVs that match corresponding remaining MFKs based on matching the non-wildcard values and wildcard values.

30 Claims, 6 Drawing Sheets

METHOD AND APPARATUS TO PERFORM A MULTI-FIELD MATCHING SEARCH

TECHNICAL FIELD

Embodiments of the invention are generally related to the data searching and, in particular, to a multi-field matching search technique.

BACKGROUND

Multi-field matching (MFM) involves finding in a data structure, such as a table, a match for a search target having more than one field. Typically, the data structure includes one or more entries having n-fields. The n-fields of the search target correspond to the n-fields of the entries in the data structure. A search is executed to find an entry that matches the search target, where a match occurs if the values in each of the n fields of the entry match the values in each of the corresponding n fields of the search target.

Each field in the search target typically has a fixed value, such as an integer or range of integers, while each field in an entry may have either a fixed value, such as an integer or a range of integers, or a wildcard value. A wildcard value, or simply wildcard, represents all fixed values that could be included in a field. A wildcard, also commonly referred to as a "don't care," may be represented in the entry by, e.g., an asterisk (*). Thus, any field in an entry that has an asterisk indicates that the field matches the corresponding field of a given search target, regardless of the fixed value in the corresponding field of the search target.

For example, MFM may be used in a data-networking environment, to provide e.g., filtering, as a data packet (also simply referred to as a packet) is transmitted across a network. With filtering, a packet that arrives at a network device, e.g., a router, may be dropped if the multiple fields in its header match the corresponding multiple fields of an entry in a table on the network device. For example, one field in an entry, such as the source address field, which indicates the network address of the device from which the packet originated, may have fixed value, i.e., the device address, while the other fields in the entry have a wildcard value. In that case, any packet whose source address matches the source address of the entry, will match the entry, because the other fields in the entry, which contain wildcards, will match any values in the other corresponding fields of the packet. This is useful if, for example, the source address of a hacker system is known, so that the network device drops any packet having that source address, regardless of the values in the other fields of the packet, to prevent the hacker system from damaging the network.

One technique for performing a MFM search is a sequential search, in which each of the values in each of the n fields of a given target is compared with each of the values in each of the corresponding n fields of each entry. Because wildcards can cause more than one entry to match the target, the entries are sorted from best to worst in terms of the number of memory accesses, so that the first matching rule is the best match based on memory accesses as compared to other possible matches. However, a disadvantage of the sequential search is that the possible number of comparisons needed to find a matching entry increases with the number of entries, as does the amount of time needed to find the matching entry, if one exists.

A technique for performing a MFM search that reduces the number of comparisons is commonly known as cross-producting. In general, cross-producting involves expanding each entry that has a wildcard into multiple entries, each of which has the wildcard replaced with one of the possible fixed values the wildcard could have. Rather than comparing the target to each entry as in a sequential search, an exact-match search is executed by directly identifying the entry whose n fields match all corresponding n fields of the target. Accordingly, cross-producting reduces the number of searches as compared to a sequential search, thereby reducing the time to perform the search. However, cross-producting increases the amount of memory needed to store the data structure, because of the additional memory needed to store the expansions of entries that contain wildcards.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A method and apparatus to perform a multi-field matching search are described. In the following description, for purposes of explanation, numerous specific details are set forth. It will be apparent, however, to one skilled in the art that embodiments of the invention can be practiced without these specific details. In other instances, structures and devices are shown in block diagram form in order to avoid obscuring the understanding of this description.

A search unit groups single fields of a multiple-field source into a search target having multiple-field keys (MFKs) whose single fields correspond to the single fields in multiple-field vectors (MFVs) of entries in a data structure. The search unit generates a set of queries based, at least in part, on the MFKs, where each query has a different MFK as a lead MFK. The search unit determines, based, at least in part, on a query, whether the non-wildcard values in the MFVs of an entry match the non-wildcard values in corresponding MFKs of the search target. If no entry has non-wildcard values in the MFVs that match the corresponding non-wildcard values in the MFKs, the search unit searches for, based, at least in part, on the set of queries, the entry having non-wildcard values in a MFV that match the non-wildcard values in a corresponding lead MFK, plus remaining MFVs that match corresponding remaining MFKs based on matching the non-wildcard values and wildcard values.

Figure 1:
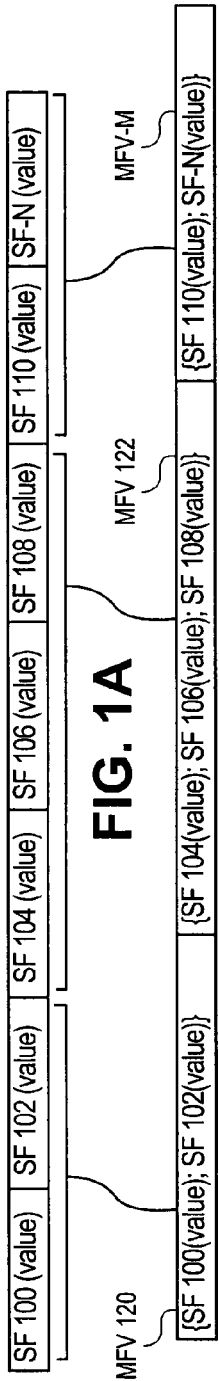
FIG. 1 is an illustration of an embodiment of multiple-field vector.

FIG. 1 is an illustration of an embodiment of multiple-field vectors. A multiple-field vector (MFV) is a group of one or more single fields. For example, in FIG. 1(*a*), single field (SF) 100, SF 102, SF 104, SF 106, SF 108, SF 110 and SF-N, where N is any number of single fields having a value, as shown. Each value may be a single fixed value, multiple random fixed values, a range of fixed values, or a combination thereof. In addition, a value may be a wildcard value. In a data-networking context, for example, single fields may include, for purposes of illustration, and not for the purposes of limitation, the following: destination address (the address of an electronic system a packet is intended to reach); source address (the address of the electronic system at which a packet originates); destination port number (an identifier of a program to which a packet is to be forwarded when it arrives at the destination); source port number (an identifier of the program from which the packet originated at the source); and protocol type (an identifier of the set of rules the source and destination use to communicate).

These single fields may be grouped to form, for example, MFV 120 through MFV-M in FIG. 1(*b*), where M is any number of multiple field vectors each having the same groupings of SF 100 through SF-N. Thus, a data structure may have, for example, entry 130 through entry-P in FIG. 1(*c*), where P is any number of entries that each includes MFV 120 through MFV-M. The only difference between each entry is in one or more of the values, as shown. A different data structure may have entries that each includes MFV 120 though MFV-M, where each MFV has the same grouping of single fields, which is a different grouping of single fields one or more MFVs than in entry 130 through entry-P. In FIG. 1(*d*), the MFVs are arranged such that the MFVs that have all non-wildcard values are contiguous and placed at the end of the entry. The reason for this arrangement will be explained below.

The values of each SF of a MFV are either all fixed values or all wildcards, as shown. Entry 130 has MFVs whose values are all non-wildcards. Entries 132 through entry-P have groups of wildcard and non-wildcard MFVs. Each entry has an operation associated with it, e.g., in the data-networking context, filtering, i.e., drop a packet or do not drop a packet. Additional examples of an operation associated with an entry include, but are not limited to, the following, which are known in the art and thus will not be described in detail:, mirroring, metering, traffic shaping, rate limiting, accounting, statistics gathering, providing quality of service (QoS), redirecting to a central processing unit (CPU) for further processing, or sampling a subset of the packets to a CPU.

Figure 2:
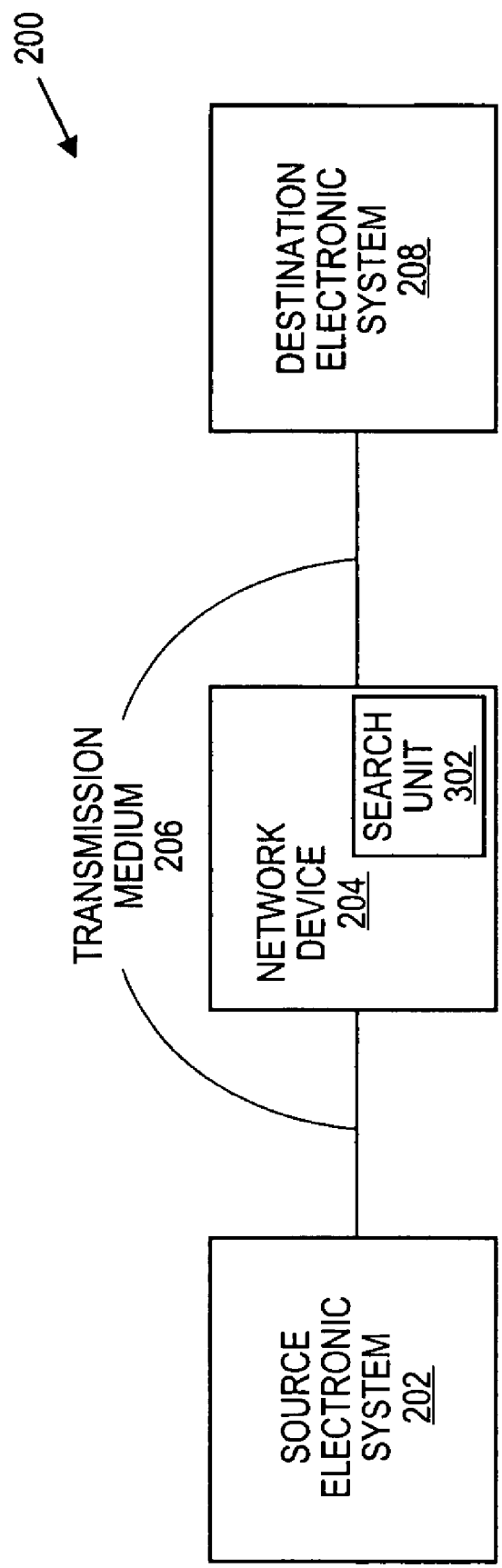
FIG. 2 is a block diagram illustrating an example embodiment of an operating environment.

FIG. 2 is a block diagram illustrating an example embodiment of data network. Data network 200 is intended to represent any data network, including, but not limited to a local area network, a personal area network, a wide area network, a metropolitan area network, or the Internet. For purposes of illustration and ease of explanation, a data network is described. However, embodiments of the invention are not limited to data networks.

Data network 200 includes source electronic system 202, which transmits packets across data network 200, and destination electronic system 208, intended to receive packets transmitted from source electronic system 202 across data network 200. Source electronic system 202 and destination electronic system 208 are intended to represent a range of electronic systems, including, but not limited to, a personal computer, a personal digital assistant (PDA), a laptop or palmtop computer, a cellular phone, a computer system, a server, or a network access device.

Data network 200 further includes network device 204, which receives packets from source electronic system 202 or from another network device 204 and performs an operation related to the packets. Operations related to packets include, by way of illustration, and not for purposes of limitation, filtering, as described above. In general, network device 204 is intended to represent a broad range of network devices. However, network device includes search unit 302 (described more fully below) enables network device 204 to perform the multi-field matching search technique described more fully below, which is not performed by conventional network devices. Accordingly, the architectural details of network device 204, except as set forth below with regard to search unit 302, need not be described further.

Data network 200 further includes transmission medium 206 to carry packets between source electronic system 202, network device 204 and destination electronic system 208. Transmission medium 206 is intended to represent any wired or wireless transmission medium known in the art, including, but not limited to, a coaxial cable, a fiber optics cable, a twisted pair phone line, or a satellite or radio signal, or a combination of any of the foregoing.

Figure 3:
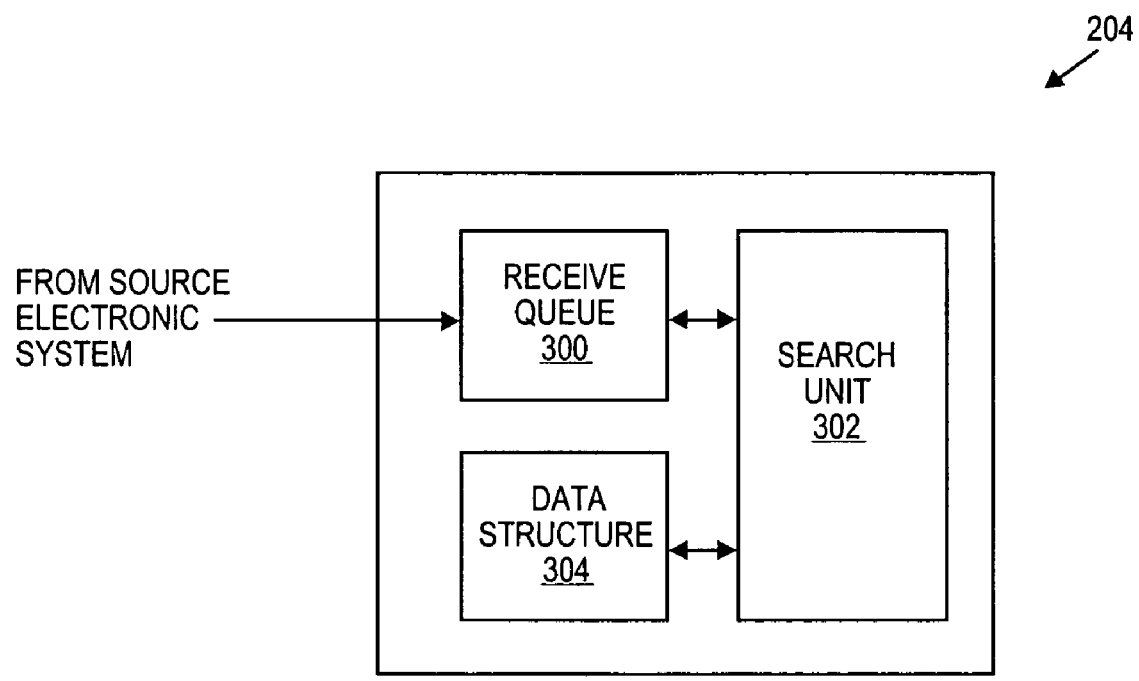
FIG. 3 is a block diagram illustrating an example embodiment of a network device.

FIG. 3 is a block diagram illustrating an example embodiment of a network device. Network device 204 includes receive queue 300, which buffers one or more packets received from source electronic device 202. Network device 204 further includes search unit 302, which performs the multi-field matching search technique described more fully below. Search unit 302 may be implemented in digital hardware logic, e.g., as an application specific integrated circuit (ASIC), in software, e.g., as computer-readable instructions that, when executed, cause network device 204 to perform the multi-field search technique described herein, or as a combination of software and hardware.

Network device 302 further includes data structure 304, e.g., a table, that has a number of entries, for example, entry 130 through entry N in FIG. 1(*c*), and an operation, for example, but not limited to, packet filtering, associated with each entry.

In one embodiment, entry in the data structure 304 includes the same number of multiple-field vectors, and each multiple-field vector includes the same single fields, as shown in FIG. 1(*c*). In addition, each single field includes a value, whether a fixed value, also referred to herein as a non-wildcard value, or a wildcard value. A multiple-field vector may include any number of single fields, i.e., one field or a grouping of any number of two or more fields. In addition, a multiple-field vector that is a grouping of single fields may include any combination of single fields.

Figure 4:
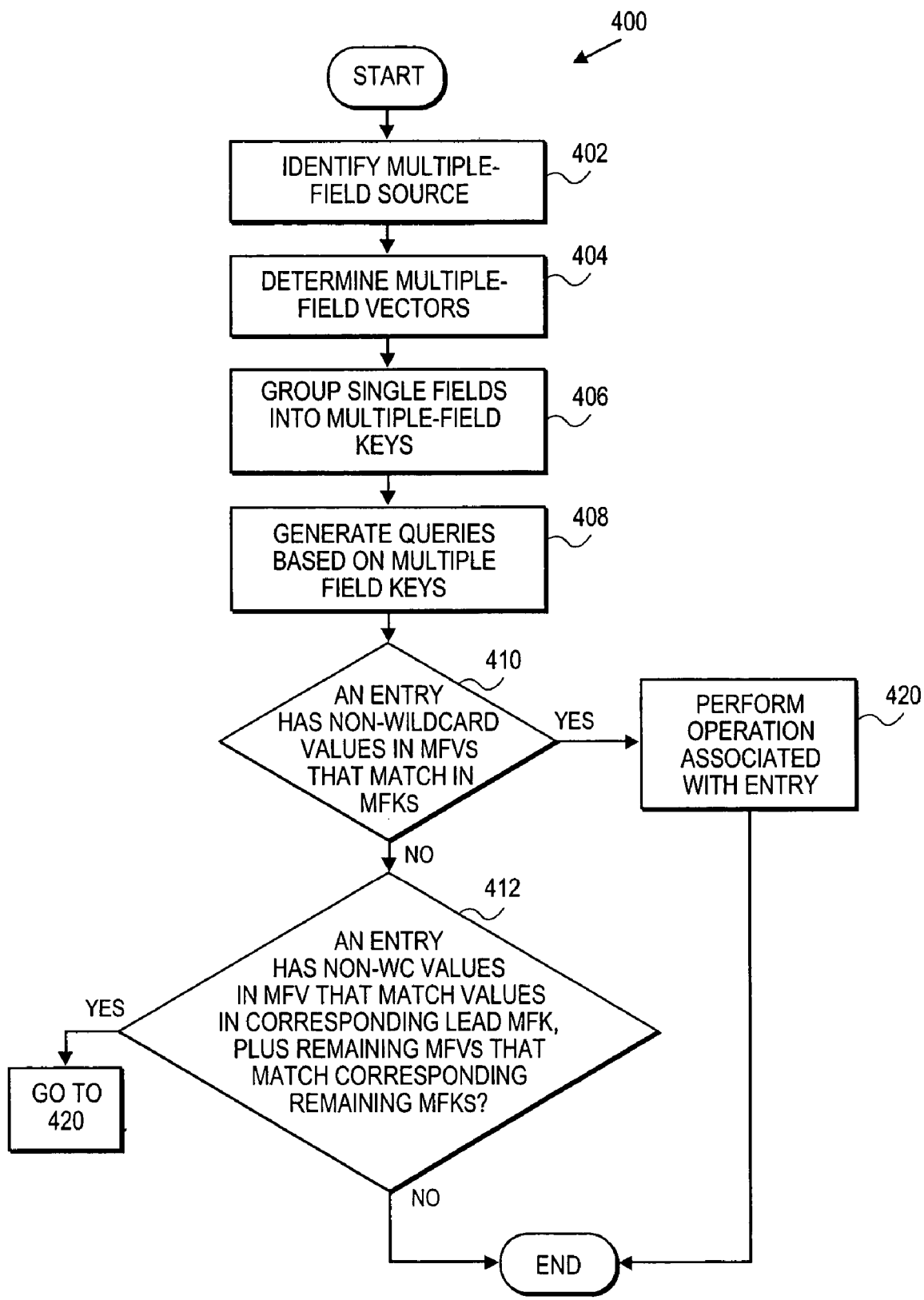
FIG. 4 is a flow chart illustrating an example embodiment of a method of performing a multi-field matching search.

FIG. 4 is a flow chart illustrating an example embodiment of a method of performing a multi-field matching search. At 402, search unit 302 identifies a multiple-field source having multiple single fields. An example of a multiple-field source is a packet having single fields in its header, that arrives in receive queue 300. For purposes of illustration and ease of explanation, the multiple-field source will be described in terms of a packet, and method 400 will be described in terms of a network device that performs an operation on the packet, based on an operation associated with a matching entry in a data structure. However, method 400 may be used to perform a MFM search in any context.

At 404, search unit 302 determines from data structure 304 the multiple-field vectors into which single fields have been grouped. The entries include some multiple-field vectors that have all non-wildcard values, e.g., entry 130 in FIG. 1(*c*). In addition, data structure 304 includes one or more entries that include combinations of one or more multiple-field vectors that have all non-wildcard values and one or more multiple-field vectors that have all wildcard values. In one embodiment, the entries in data structure 304 are stored such that the MFVs that have all non-wildcard values are contiguous and placed at the end of the entry, e.g., as in entry 132 through entry-P in FIG. 1(*d*). As stated previously, a MFV may include one single field, or more two or more single fields. Search unit 302 may arrange the entries such that the wildcard MFVs are contiguous and at the end of the entry. However, the entries may be arranged in this manner other than by search unit 302, e.g., the entries are arranged in this manner when data structure 304 is initially generated, or by a combination of search unit 302 and other than by search unit 302. In an alternative embodiment, the MFVs of the entries in data structure 304 are not arranged in any specified manner.

At 406, search unit 302 groups the single fields in the packet into MFKs of a search target, where the MFKs of the search target include the same numbers and groupings of single fields as the MFVs of the entries in data structure 304 (an example is described below). As used herein, a MFK refers to a group of single fields of a multiple-field source. Two or more MFKs, which correspond to the MFVs of an entry in data structure 304, constitute a search target for which search unit 302 attempts to find a matching entry in data structure 304.

Figure 5:
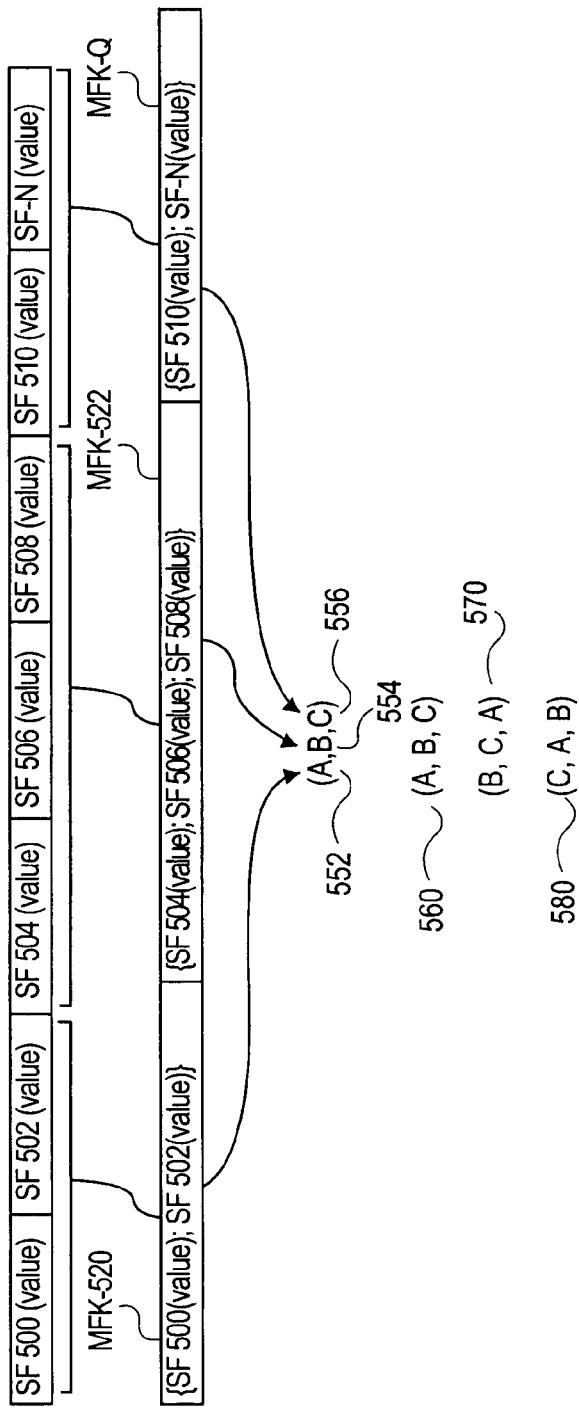
FIG. 5 illustrates an example embodiment of queries generated to perform a multi-field matching search.

At 408, search unit 302 generates a set of queries based, at least in part, on the MFKs, where each query has a different MFK as the lead MFK. FIG. 5 illustrates an example embodiment of queries generated to perform a multi-field matching search. For example, in FIG. 5(a), SF 500, SF 502, SF 504, SF 506, SF 508, SF 510 and SF-N in a multiple-field source, such as a packet. SF-500 through SF-N correspond to SF-1 through SF-N in FIG. 1(a), and are grouped to form, for example, search target 550 made up of MFK 520, MFK 522 and MFK-Q (where Q is any number of MFKs that equals the number of MFVs in the entries in data structure 304) which have the same groupings of single fields as, and thus correspond to, MFV 120, MFV 122 and MFV-M in FIG. 1(b). For ease of reference, MFK 520 is mapped to A 552, MFK 522 is mapped to B 554 and MFK-Q is mapped to C 554.

Although the multiple-field source in FIG. 5(a) contains only single fields that correspond to the single fields grouped to form the MFVs in FIG. 1(a), a multiple-field source may have single fields in addition to the single fields that correspond to the single fields grouped to form MFVs. However, the single fields that do not correspond to the single fields grouped to form MFVs are not used in to form the search target. Each value in SF 500 through SF-N may be a single fixed value, multiple random fixed values, a range of fixed values, or a combination thereof, but none of the values is a wildcard value.

If (A,B,C) 550 is a search target having MFKs A 552, B 554 and C 556, at 408, search unit 302 generates query 560 that is based on A 502 as the lead MFK, query 570 based on B 504 as the lead MFK, and query 580 based on C 506 as the lead MFK, as shown in FIG. 5(b). Although FIG. 5(b) illustrates example queries generated based on three MFVs, the example queries may be generated based on any number of MFKs that corresponds to the number of MFVs in the entries of a data structure.

At 410, search unit 302 uses one of the queries generated at 408 to determine whether an entry in data structure 304 has non-wildcard values in its MFVs that match the non-wildcard values in the corresponding MFKs. Using each of the queries generated at 408 to perform this search would be redundant, since a search for an entry whose MFV values match the MFKs of each query would for each query be a search for the same MFKs, despite each search query being a different ordering of the MFKs, with each MFK as the lead MFK. However, the search at 410 may be performed using each query generated at 408. If at 410 a match is found, at 420, search unit 302 performs the operation associated with the matching entry.

Conversely, if at 410 no matching entry is found, at 412, search unit 302 uses the queries generated at 408 to determine whether an entry in data structure 304 has non-wildcard values in a MFV that match the non-wildcard values in the corresponding lead MFK of the query, plus remaining MFVs that match the corresponding remaining MFKs based on matching corresponding non-wildcard values and wildcard values. The search at 412 is referred to herein as a modified multi-field matching (MMM) search.

For example, in FIG. 5(a), at 410, search unit 302 determines whether an entry, e.g., entry 130 in FIG. 1(d), has non-wildcard values in each of MFV-120, MFV-122 and MFV-M that match the non-wildcard values in the corresponding MFK-520, MFK-522 and MFK-Q, respectively. If none of the entries match at 410, search unit 302 performs a MMM search. That is, search unit 302 searches for an entry, e.g., entry 132 through entry-P in FIG. 1(d), having non-wildcard values in its MFV that match the non-wildcard values in the corresponding lead MFK, e.g., when the query is (A, B, C) 560, MFV 120, matches MFK 520, since MFK 520 is the lead MFK, plus remaining MFVs that match the corresponding remaining MFKs based on matching corresponding non-wildcard values and wildcard values.

For example, if the query is (A, B, C) 560, the MMM search is for an entry in which the non-wildcard values in MFV 120 match non-wildcard values in lead MFK 520, and with regard to the remaining MFVs, the non-wildcard values in MFV 122 match non-wildcard values in MFK 522, and MFV-M matches MFK-Q because both have wildcards. Alternatively, again if the query is (A, B, C) 560, the MMM search is for an entry in which the non-wildcard values in MFV 120 match non-wildcard values in MFK 520, and with regard to the remaining MFVs, MFV 122 matches MFK 522 because both have wildcards, and MFV-M matches MFK-Q because both have wildcards.

By way of example, and not for purposes of limitation, a technique for performing a MMM search is any longest prefix matching (LPM) search known in the art that is modified so that entries other than the longest match are searched. Typically, with a LPM search, a match may occur if an entry matches a search target in part. Thus, a number of matches may occur. However, among a number of entries that constitute a match, the one that matches to the greatest extent is chosen as the best match. For example, with LPM, if a search target is (X, Y, Z), the best match is an entry that has (X,Y,Z), i.e., an exact match.

In the absence of the exact match, another best match is determined based on matching the search target in part. For example, an entry that has (X) only is a match, because it matches the search target in part. However, an entry that has (X, Y) only is also a match, and is a better match than the entry that has X, because it matches the search target to a greater extent (commonly referred to as being more specific than the entry that has X, which is thus commonly referred to as being less specific). Thus, the most specific entry, i.e., (X, Y), is the best match, in the absence of the entry that has (X, Y, Z), and the less specific entry, (X) is disregarded, though the entry that contains (X) is the most specific, and thus best match, in the absence of (X,Y,Z) and (X,Y).

However, to perform a MMM search based on a LPM search, the LPM search is modified, so a single query generates a search for less specific entries, as well as the most specific entry. Thus, for example, in FIG. 5(b), query 560 will generate a search for entries that have (A, B, C), (A, B, *), which is the most specific entry other than (A,B,C), and (A,*,*), which is a less specific entry, but not disregarded as in LPM search techniques (query 560, as well as queries 570 and 580, also generate a search for (*,*,*), which will be considered in more detail below.) Similarly, query 570 will generate a search for (B,C,A) (which is covered by (A,B,C) in query 560), (B,C,*) and (B,*,*), and query 580 will generate a search for (C,A,B) (which is covered by (A,B,C) in query 560), (C,A,*) and (C,*,*). Therefore, search unit 302 performs a search using query 560, searching for an entry that matches (A,B,C), (A,B,*) or (A*,*), and if there is no match, then uses query 570 to search for an entry than matches (B,C,*) or (B,*,*), and if there is no match, uses query 580 to search for an entry that matches (C,A,*) and (C,*,*).

Consequently, rather than performing a sequential search on all the entries, or an exact-match search after expanding an entry having wildcards into multiple entries that include all the possible values the wildcard represents, as in cross-producting, the MMM search is performed using a relatively small number of queries. This reduces the number of searches as compared to the sequential search, and as compared to cross-producting, reduces the memory consumed by the queries, since queries are not generated by expanding entries that include wildcards in one or more fields into multiple entries that include all possible values the wildcard can have.

The MMM search is also useful when the queries generated at 408 are intermediate queries using fewer fields than are contained in a search target. For example, a search target may have fields (X,Y,Z,L,M,N), whereas the search queries generated at 408 are based on X, Y and Z only.

For example, the MFK (X,Y,Z,L,M,N) may be a search target, where data structure 304 includes two entries (X,Y,*, A,B,C) and (X,*,*,L,M,N). The queries (X,Y,Z), (Y,Z,X), and (Z,X,Y) above may be used as intermediate queries to search for one entry having values in its lead MFV that match the values in the corresponding lead MFK of the query, plus one or more remaining MFVs that match the corresponding one or more remaining MFKs based on matching non-wildcard values and/or wildcard values. In that case, the entry having (X,Y,*) is the match. However, the remaining fields of the entry, i.e., (A,B,C), do not match the remaining fields of the target, i.e., LMN. However, because a MMM search involves a search less specific entries the entry having (X,*,*) is searched as a potential match. Because the remaining fields of the entry containing (X,*,*), i.e., (L,M,N), match the remaining fields of the search target, the matching entry (X,*,*,L,M,N) is found.

In another embodiment, search unit 302 can expand less specific entries into more specific entries, so that if a conventional LPM search is performed, a match will be found. For example, if MFK (X,Y,Z,L,M,N) may be a search target, where data structure 304 includes two entries (X,Y,*,A,B,C) and (X,*,*,L,M,N), where X, Y, A, B, C, L, M and N are MFVs. (X,*,*,L,M,N) can be expanded into (X,Y,*,L,M,N), which is more specific than (X,*,*,L,M,N). Thus, if a LPM search is conducted, both the original entry (X,Y,*,A,B,C) and the expanded entry (X,Y,*,L,M,N) will generate matches. In that case, a match for the LPM search will be found, i.e., (X,Y,*,L,M,N), whereas with the original entries, there would be no match because (X,Y,*) is a longer prefix match than (X*,*), but does not match the last three MFVs, and while (X,*,*,L,M,N) is a match, it is no considered because it is not the LPM.

Returning to FIG. 4, if a match is found at 412, then at 420, search unit 302 performs the operation associated with the matching entry. However, if no match is found at 412, method 400 ends. In that case, search unit 302 may, for example, perform an operation associated with a search for all wildcards, e.g., (*,*,*) in FIG. 5(b), which is covered by all of the queries generated at 408. The search for all-wildcards (referred to herein as a default search) applies when no entry in data structure 304 is otherwise a match at 412, and thus a particular operation may be associated with the default search.

FIG. 4 describes example embodiments of the invention in terms of a computer-implemented method. However, one should also understand it to represent a computer-readable storage medium having recorded, encoded or otherwise represented thereon instructions, routines, operations, control codes, or the like, that when executed by or otherwise utilized by an electronic system, cause the electronic system to perform the methods as described above or other embodiments thereof that are within the scope of this disclosure.

Figure 6:
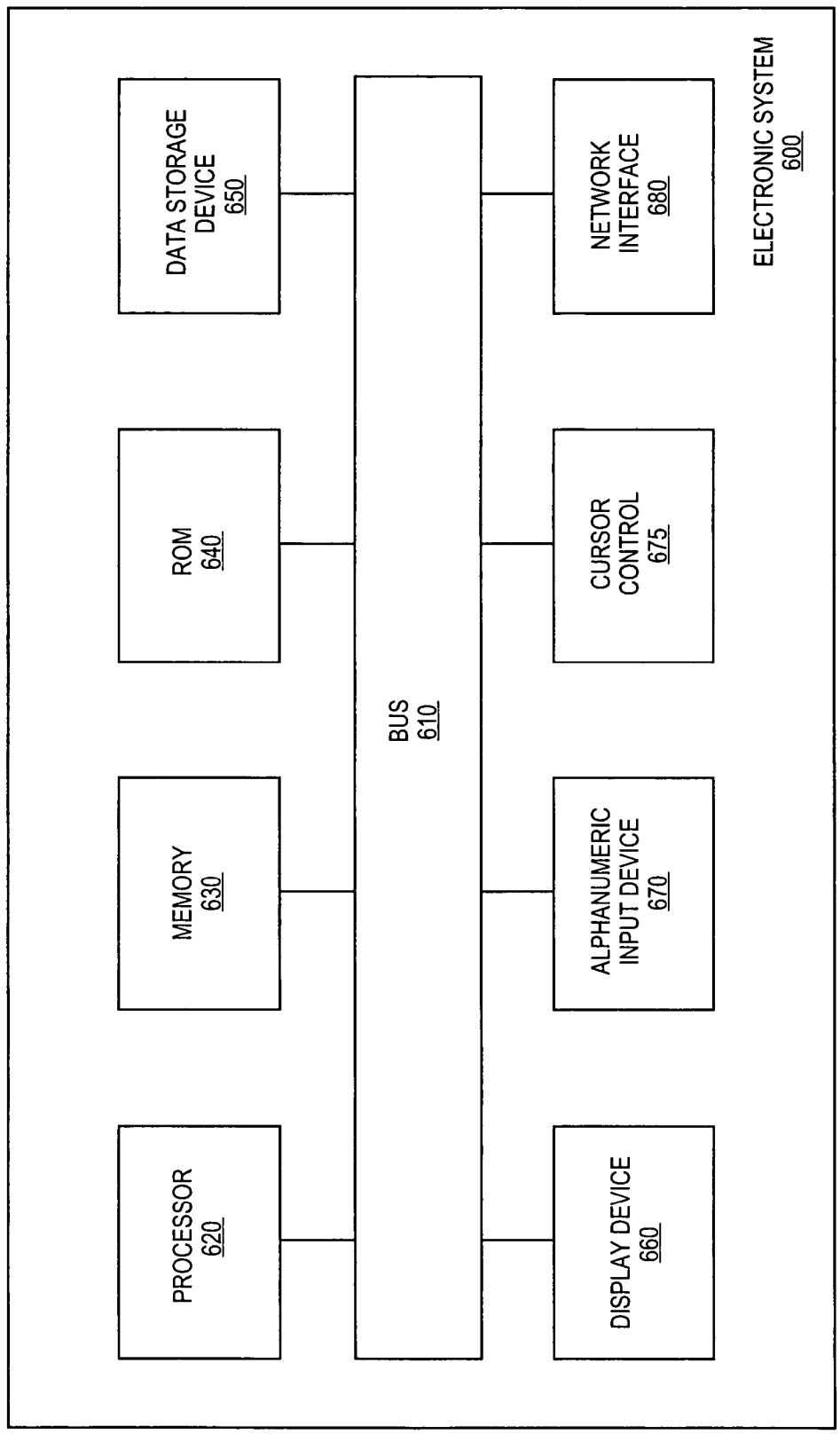
FIG. 6 is a block diagram illustrating one embodiment of an electronic system.

FIG. 6 is a block diagram illustrating one embodiment of an electronic system. The electronic system is intended to represent a range of electronic systems, including, for example, a personal computer, a personal digital assistant (PDA), a laptop or palmtop computer, a cellular phone, a computer system, a network access device, etc. Other electronic systems can include more, fewer and/or different components. The computer-implemented methods of FIG. 4 can be implemented as sequences of instructions executed by the electronic system. The sequences of instructions can be stored by the electronic system, or the instructions can be received by the electronic system (e.g., via a network connection). The electronic system can be coupled to a wired network, e.g., via a cable such as a coaxial cable, a fiber optics cable, or a twisted-pair phone line, a wireless network, e.g., via radio or satellite signals, or a combination thereof Electronic system 600 includes a bus 610 or other communication device to communicate information, and processor 620 coupled to bus 610 to process information. While electronic system 600 is illustrated with a single processor, electronic system 600 can include multiple processors and/or co-processors.

Electronic system 600 further includes random access memory (RAM) or other dynamic storage device 630 (referred to as memory), coupled to bus 610 to store information and instructions to be executed by processor 620. Memory 630 also can be used to store temporary variables or other intermediate information while processor 620 is executing instructions. Electronic system 600 also includes read-only memory (ROM) and/or other static storage device 640 coupled to bus 610 to store static information and instructions for processor 620. In addition, data storage device 650 is coupled to bus 610 to store information and instructions. Data storage device 650 may comprise a magnetic disk (e.g., a hard disk) or optical disc (e.g., a CD-ROM) and corresponding drive.

Electronic system 600 may further comprise a display device 660, such as a cathode ray tube (CRT) or liquid crystal display (LCD), to display information to a user. Alphanumeric input device 670, including alphanumeric and other keys, is typically coupled to bus 610 to communicate information and command selections to processor 620. Another type of user input device is cursor control 675, such as a mouse, a trackball, or cursor direction keys to communicate direction information and command selections to processor 620 and to control cursor movement on display device 660. Electronic system 600 further includes network interface 680 to provide access to a network, such as a local area network or wide area network.

Instructions are provided to memory from a computer-readable storage medium, or an external storage device accessible via a remote connection (e.g., over a network via network interface 680) providing access to one or more electronically-accessible media, etc. A computer-readable storage medium includes any mechanism that stores information in a form readable by a computer. For example, a computer-readable storage medium includes RAM; ROM; magnetic or optical storage medium; or flash memory devices.

In alternative embodiments, hard-wired circuitry can be used in place of or in combination with software instructions to implement the embodiments of the present invention. Thus, the embodiments of the present invention are not limited to any specific combination of hardware circuitry and software instructions.

Reference in the foregoing specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the embodiments of the invention. The specification and drawings are, accordingly, are to be regarded in an illustrative rather than a restrictive sense.

What is claimed is:

1. A computer-implemented method utilizing a processor comprising:
    grouping single fields of a multiple-field source in a computer memory into a plurality of multiple-field keys (MFKs) of a search target, each MFK of the search target having single fields that correspond to single fields in one of a plurality of multiple-field vectors (MFVs) of entries in a data structure;
    utilizing the processor to generate a set of queries based, at least in part, on the MFKs, wherein each query includes one or more of the MFKs and wherein each query has a different MFK as a lead MFK;
    using a query to determine whether the non-wildcard values in the MFVs of an entry match the non-wildcard values in corresponding MFKs of the search target; and:
        if an entry has non-wildcard values in the MFVs that match the corresponding non-wildcard values in the MFKs, then performing an operation associated with the matching entry; or
        if no entry has non-wildcard values in the MFVs that match the corresponding non-wildcard values in the MFKs, then using the queries to determine whether the entry has non-wildcard values in a MFV that match the non-wildcard values in a corresponding lead MFK, and whether remaining MFVs of the entry match corresponding remaining MFKs based on matching the non-wildcard values and wildcard values.

2. The method of claim 1, wherein the entries of the data structure are stored in the computer memory such that the MFVs that have non-wildcard values are located at the end of the entry.

3. The method of claim 1, further comprising arranging the entries of the data structure so that the MFVs that have non-wildcard values are placed at the end of the entry.

4. The method of claim 1, wherein the non-wildcard values comprise a fixed value, a range of fixed values, or both.

5. The method of claim 1, further comprising:
    locating the entry having non-wildcard values in the MFV that match the non-wildcard values in the corresponding lead MFK and having remaining MFVs that match corresponding remaining MFKs based on matching the non-wildcard values and wildcard values; and
    performing an operation associated with the located entry.

6. The method of claim 1, wherein the multiple-field source comprises a data packet having single fields in its header.

7. The method of claim 6, wherein the operation comprises one of the following: dropping the data packet, mirroring, metering, traffic shaping, rate limiting, accounting, statistics gathering, providing quality of service (QoS), redirecting to a central processing unit (CPU) for further processing, or sampling a subset of the packets to a CPU.

8. The method of claim 1, wherein fewer than all MFVs in the entries include one single field.

9. The method of claim 1, wherein the MFVs in the entries include two or more single fields.

10. An apparatus comprising:
    a processor to process data;
    a computer memory to store data, the computer memory including a data structure having a plurality of entries, wherein each entry has a group of multiple-field vectors (MFVs) that each include a number of single fields having all wildcard values or all non-wildcard values; and
    a search unit to group single fields of a multiple-field source into a plurality of multiple-field keys (MFKs) of a search target, each MFK having single fields that correspond to the single fields in a corresponding MFV of the entries in the data structure, generate a set of queries based, at least in part, on the MFKs, wherein each query includes one or more of the MFKs and has a different MFK as a lead MFK, use a query to determine whether the non-wildcard values in the MFVs of an entry match the non-wildcard values in corresponding MFKs of the search target; and:
        if an entry has non-wildcard values in the MFVs that match the corresponding non-wildcard values in the MFKs, then performing an operation associated with the matching entry; or
        if no entry has non-wildcard values in the MFVs that match the corresponding non-wildcard values in the MFKs, using the queries to determine whether the entry has non-wildcard values in a MFV that match the non-wildcard values in a corresponding lead MFK, and whether remaining MFVs of the entry match corresponding remaining MFKs based on matching the non-wildcard values and wildcard values.

11. The apparatus of claim 10, wherein the entries of the data structure are stored in the computer memory such that the MFVs that have non-wildcard values are located at the end of the entry.

12. The apparatus of claim 10, wherein the search unit arranges the entries of the data structure so that the MFVs that have non-wildcard values are placed at the end of the entry.

13. The apparatus of claim 10, wherein the non-wildcard values comprise a fixed value, a range of fixed values, or both.

14. The apparatus of claim 10, wherein the search unit locates the entry having non-wildcard values in the MFV that match the non-wildcard values in the corresponding lead MFK and having remaining MFVs that match corresponding remaining MFKs based on matching the non-wildcard values and wildcard values; and performs an operation associated with the located entry.

15. The apparatus of claim 10, wherein the multiple-field source comprises a data packet having single fields in its header.

16. The apparatus of claim 15, wherein the operation comprises one of the following: dropping the data packet, mirroring, metering, traffic shaping, rate limiting, accounting, statistics gathering, providing quality of service (QoS), redirecting to a central processing unit (CPU) for further processing, or sampling a subset of the packets to a CPU.

17. The apparatus of claim 10, wherein fewer than all MFVs in the entries include one single field.

18. The apparatus of claim 10, wherein the MFVs in the entries include two or more single fields.

19. An article of manufacture comprising:
a computer-readable storage medium including thereon sequences of instructions that, when executed, cause a processor to:
group single fields of a multiple-field source in a computer memory into a plurality of multiple-field keys (MFKs) of a search target, each MFK of the search target having single fields that correspond to single fields in one of a plurality of multiple-field vectors (MFVs) of entries in a data structure;
generate a set of queries based, at least in part, on the MFKs, wherein each query includes one or more of the plurality of MFKs and wherein each query has a different MFK as a lead MFK;
use a query to determine whether the non-wildcard values in the MFVs of an entry match the non-wildcard values in corresponding MFKs of the search target; and:
if an entry has non-wildcard values in the MFVs that match the corresponding non-wildcard values in the MFKs, then performing an operation associated with the matching entry; or
if no entry has non-wildcard values in the MFVs that match the corresponding non-wildcard values in the MFKs, then use the queries to determine whether the entry has non-wildcard values in a MFV that match the non-wildcard values in a corresponding lead MFK, and whether remaining MFVs of the entry match corresponding remaining MFKs based on matching the non-wildcard values and wildcard values.

20. The article of manufacture of claim 19, wherein the entries of the data structure are stored in computer memory such that the MFVs that have non-wildcard values are located at the end of the entry.

21. The article of manufacture of claim 19, wherein the computer-readable storage medium further comprises sequences of instructions that, when executed, cause the electronic system to arrange the entries of the data structure so that the MFVs that have non-wildcard values are placed at the end of the entry.

22. The article of manufacture of claim 19, wherein the non-wildcard values comprise a fixed value, a range of fixed values, or both.

23. The article of manufacture of claim 19, wherein the computer-readable storage medium further comprises sequences of instructions that, when executed, cause the processor to:
locate the entry having non-wildcard values in the MFV that match the non-wildcard values in the corresponding lead MFK and having remaining MFVs that match corresponding remaining MFKs based on matching the non-wildcard values and wildcard values; and
perform an operation associated with the located entry.

24. The article of manufacture of claim 19, wherein the multiple-field source comprises a data packet having single fields in its header.

25. The article of manufacture of claim 24, wherein the operation comprises one of the following: dropping the data packet, mirroring, metering, traffic shaping, rate limiting, accounting, statistics gathering, providing quality of service (QoS), redirecting to a central processing unit (CPU) for further processing, or sampling a subset of the packets to a CPU.

26. The article of manufacture of claim 19, wherein fewer than all MFVs in the entries include one single field.

27. The article of manufacture of claim 24, wherein the MFVs in the entries include two or more single fields.

28. A system, comprising:
a processor;
a network interface coupled with the processor; and
an article of manufacture comprising a computer-readable storage medium including thereon sequences of instructions that, when executed, cause a processor to:
group single fields of a multiple-field source into a plurality of multiple-field keys (MFKs) of a search target, each MFK of the search target having single fields that correspond to the single fields in one of a plurality of multiple-field vectors (MFVs) of entries in a data structure;
generate a set of queries based, at least in part, on the MFKs, wherein each query includes one or more of the plurality of MFKs and has a different MFK as a lead MFK;
use a query to determine whether the non-wildcard values in the MFVs of an entry match the non-wildcard values in corresponding MFKs of the search target; and:
if an entry has non-wildcard values in the MFVs that match the corresponding non-wildcard values in the MFKs, then performing an operation associated with the matching entry; or
if no entry has non-wildcard values in the MFVs that match the corresponding non-wildcard values in the MFKs, then use the queries to determine whether the entry has non-wildcard values in a MFV that match the non-wildcard values in a corresponding lead MFK, and whether remaining MFVs of the entry match corresponding remaining MFKs based on matching the non-wildcard values and wildcard values.

29. The system of claim 28, wherein the non-wildcard values comprise a fixed value, a range of fixed values, or both.

30. The system of claim 28, wherein the multiple-field source comprises a data packet having single fields in its header.

* * * * *